United States Patent [19]

Lea et al.

[11] 4,416,162
[45] Nov. 22, 1983

[54] GRAM BEAM FORCE GAUGE

[75] Inventors: Alfred L. Lea, Doylestown, Pa.; Frank A. Votta, Jr., Clearwater, Fla.

[73] Assignee: Ametek, Inc., New York, N.Y.

[21] Appl. No.: 369,350

[22] Filed: Apr. 19, 1982

[51] Int. Cl.³ .............................................. G01L 1/04
[52] U.S. Cl. ................................................. 73/862.62
[58] Field of Search ............... 73/862.62, 862.63, 381; 177/225, 234

[56] References Cited

U.S. PATENT DOCUMENTS 1,641,603  9/1927  Rockefeller, Jr. ............... 73/862.62
2,612,042  9/1952  Clarke ............................ 73/862.62

Primary Examiner—Jerry W. Myracle
Attorney, Agent, or Firm—Harding, Earley, Follmer & Frailey

[57] ABSTRACT

A gram beam force gauge has a housing having a peripheral wall and a partition with a front face and a rear face substantially perpendicular to the peripheral wall. A pointer overlies a dial mounted on the front face of the partition and is mounted on a rotatable shaft passing through the partition. A pinion on the shaft to the rear of the partition engages a sector gear mounted on a drum which in turn is rotatably mounted adjacent the rear face of the partition on an axis parallel to the axis of the pinion. A flexible band passes around the drum and has each free end connected to one end of an extension coil spring. The first spring has its outer end secured to the housing and the second spring has its other end secured to a slide for preloading the springs and zero adjusting the pointer. A force transmitting beam is secured to the drum and extends beyond the housing. Advantageously, the slide is a slotted block retained by a headed screw secured to the partition. It is preferred to have the band and spring straddling the sector gear and pinion and the force beam extending in a direction away from the springs.

4 Claims, 6 Drawing Figures

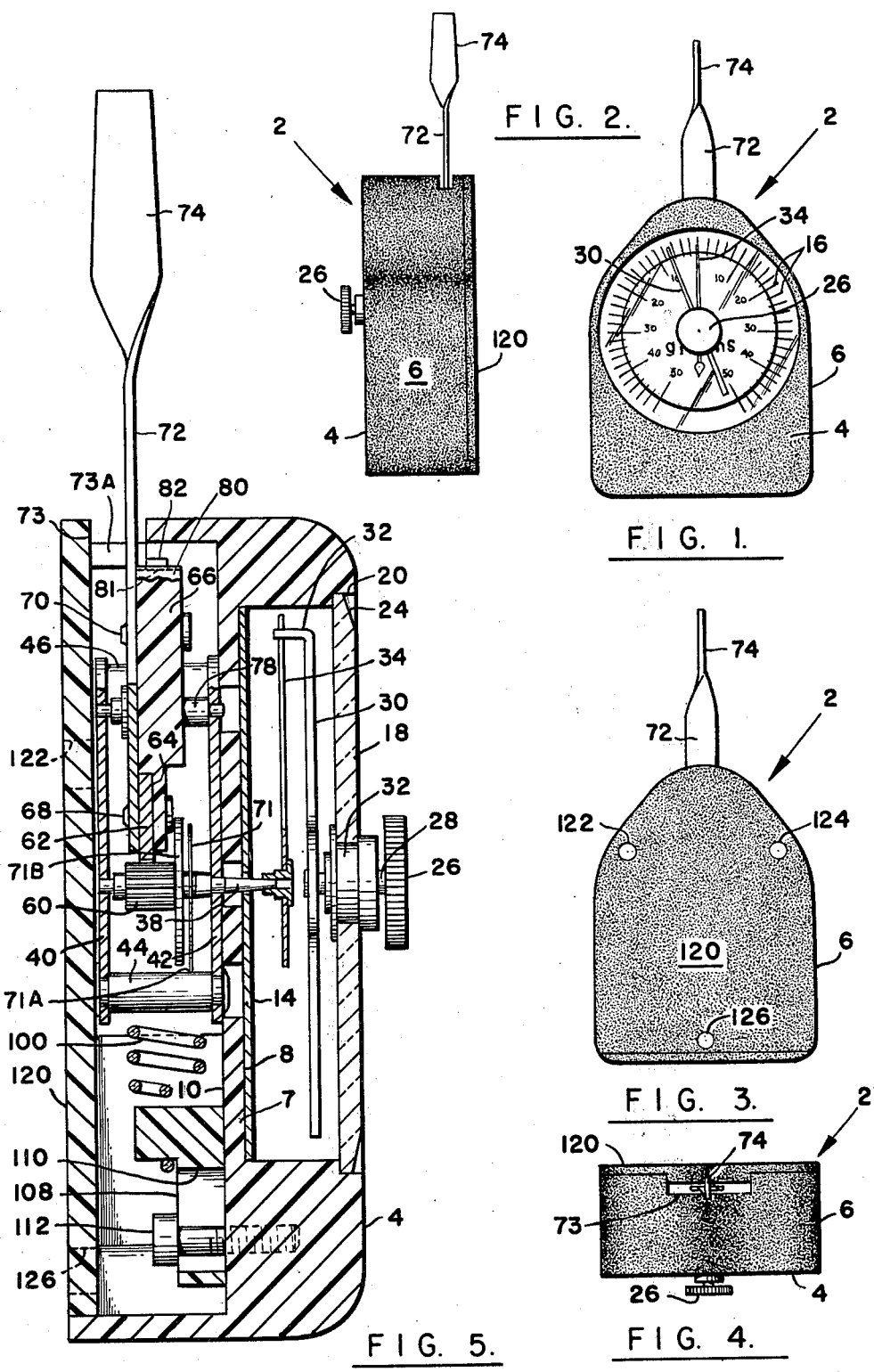

GRAM BEAM FORCE GAUGE

TECHNICAL FIELD

This invention is in the field of force gauges.

BACKGROUND OF THE PRIOR ART

It is well known to use springs in force devices as shown in the following U.S. Pat. Nos.: 730,477; 836,752; 948,140; 1,359,449; 1,574,491; 2,007,880; 2,174,356; 2,199,553; 3,116,634; 3,175,393; 3,942,367.

It is also known to use a band to transmit a force from a rotating member to a coil spring as seen in U.S. Pat. Nos. 836,752, 948,140, 3,116,634, 3,942,367 and 3,175,393. The latter patent discloses the use of bands around rotatable discs with coil springs secured to the free ends of the bands in a dynamometer.

U.S. Pat. Nos. 1,574,491, 2,007,880, 2,174,356 and 2,199,553 and further illustrative of torque testing devices employing coil springs.

Applicant's invention overcomes the problems of the prior art of the employment of pretensioned extension springs positioned in parallel and involving negligible friction and provided with a simply operated slider means for preloading the springs and zero adjusting the accompanying pointer. The gram gauge of the invention is compact, accurate and inexpensive as compared to prior art gram gauges.

BRIEF SUMMARY OF THE INVENTION

A gram beam force gauge has a housing having a peripheral wall and a dividing partition with a front face and a rear face substantially perpendicular to the peripheral wall. A pointer overlies a dial mounted on the front face of the partition and is mounted on a rotatable shaft passing through the partition. A pinion on the shaft to the rear of the partition engages a sector gear mounted on a drum which in turn is rotatably mounted adjacent the rear face of the partition to an axis parallel to the axis of the pinion. A flexible band passes around the drum and has each free end connected to an extension coil spring. The first spring has its outer end secured to the housing and the second spring has its other end secured to a slide for preloading the springs and zero adjusting the pointer. A force transmitting beam is secured to the drum and extends beyond the housing. Advantageously, the slide is a slotted block retained by a headed screw secured to the partition. It is preferred to have the band and springs straddling the sector gear and pinion and the force beam extending in a direction away from the springs.

BRIEF DESCRIPTION OF THE DRAWINGS

FIG. 1 is a front elevation of a gram gauge in accordance with the invention;

FIG. 2 is a right side elevation of the device of FIG. 1;

FIG. 3 is a rear elevation of the device of FIG. 1;

FIG. 4 is a top plan view of the device of FIG. 1;

FIG. 5 is a vertical section through the device of FIG. 1 taken on the plane indicated by the line 5—5 in FIG. 6.

DETAILED DESCRIPTION

Figure 6:
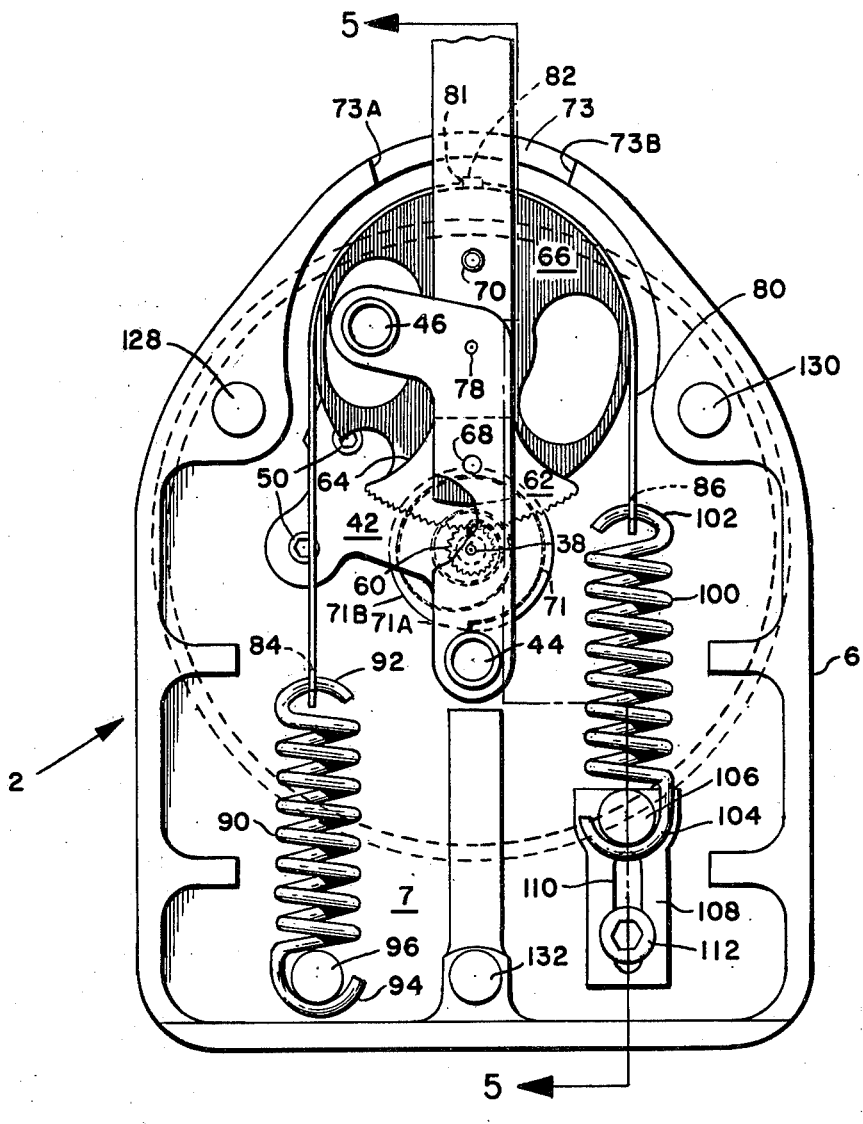
FIG. 6 is a rear elevation of the device of FIG. 1 with the rear panel removed.

A gram beam force gauge 2 has a housing 4 with a peripheral wall 6. The interior of the housing 4 is separated by a dividing partition 7 having a front face 8 and rear face 10. A dial face 14 is adhesively secured to the front side 8 of partition 7 and carries appropriate indicia in this case graduation marks 16 each indicating 2 grams.

Overlying the dial face 14 is a transparent cover 18 mounted by a pressed fit in a peripheral recess 20 in housing 4. A knob 26 is integral with a shaft 28 which passes through a bearing 32 mounted in the center of cover 18 and which is connected to a maximum reading needle 30 having an offset portion 32 overlapping pointer 34 and adapted to indicate and hold the maximum reading of pointer 34.

Pointer 34 is fixedly secured to a shaft 38 which passes through dial face 14 and partition 7 and is mounted for rotation in a pair of opposed plates 40 and 42 which are held together with spacers 44 and 46. As best seen in FIG. 6, plate 42 is secured to partition 7 by screws 50.

A pinion 60 secured to shaft 38 is engaged by a sector gear 62 mounted in a recess 64 of a drum 66. The sector gear is secured in recess 64 by a rivet 68 which also secures a beam 72 to drum 66. A partially wound spiral hair spring 71 has its inner end secured to shaft 38 and its outer end secured at 71A to spacer 44. Hair spring 71 acts to eliminate backlash between pinion 60 and sector gear 62. A disc 71B secured to shaft 38 limits the sidewise movement of spring 71.

Beam 72 is secured to drum 66 also by a rivet 70 and passes through a cut-out portion 73 of wall 6. Wall 6 has stop portions 73A and 73B to limit the travel of beam 72. Beam 72 has a load bearing end portion 74 turned at 90° to the remainder of the beam.

Drum 66 is fixedly secured to a shaft 78 mounted for rotation in the plates 40 and 42 as best seen in FIG. 5.

A flexible band 80 of, for example, steel passes around drum 66 and has an opening 81 received in a test indicated at 82 (FIG. 5) which projects from drum 66. The ends of band 80 have openings 84 and 86, respectively (FIG. 6). An extension coil spring 90 has one end 92 engaging band 80 through opening 84 and the other end 94 engaging a pin 96 which is integral with housing 4. An extension coil spring 100 has one end 102 engaging band 80 through opening 86 and the other end 104 engaging a pin 106 integral with a slide 108. Slide 108 has a slot 110 through which passes a headed screw 112 which is threaded to housing 4 to retain slide 108 in a predetermined position. The position of spring 100 is offset upwardly from the position of spring 90 to provide room for the operation of slide 108. With the pointer 34 on zero on the dial 14, springs 90 and 100 are pre-loaded and remain preloaded during operation to insure maximum linearity of the forces exerted by them. Typical preloading for a 50 gram full scale gauge will be 1.293 lb. The ratios of the lever arms and actuating lever to pointer dictate a gradient of 2.395 lb/in for each spring and system gradient of 4.790 lb/in. Slide 108 is used to zero adjust pointer 34 and is then secured by screw 112.

A back cover 120 has openings 122, 124 and 126 which respectively receive in a pressed fit pins 128, 130 and 132 which are an integral part of housing 4.

Gauge 2 is superior to gauges using a cantilever spring in which the point of application of the loading force is applied in such a manner that the length of the cantilever varies as a function of the applied load. While the change is small, about 18° maximum, and the change in the lever length is small, it does compromise linearity. In the case of gauge 2, the extension springs are loaded axially and the ends are free to rotate so that the system is linear over its range. Construction is much simpler requiring a single adjustment to center the lever and no adjustment for rate. The accuracy of the system then becomes a function of the accuracy of the spring gradient.

OPERATION

In operation either side of portion 74 of beam 72 as may be most convenient is used to measure a force, for example, the force necessary to close a switch. The force action on beam 72 causes drum 66 to rotate clockwise or counterclockwise causing band 80 to extend one of the springs and permit the other spring to contract. The force is indicated by the position of pointer 34 relative to the graduation marks 16 on dial face 14. The maximum loading needle 30 is positioned by the use of knob 26 before operation so that pointer 34 will engage extension portion 32 and move needle 30 along with the pointer 34. There is sufficient friction in the mounting of shaft 28 so that when the pointer 34 is permitted to return to zero, the needle 30 will remain in place showing the maximum force reading.

We claim:

1. A gram beam force gauge comprising:
   a housing having a peripheral wall and a partition with a front face and a rear face substantially perpendicular to the peripheral wall,
   a dial mounted on the front face of said partition,
   a pointer overlying said dial and mounted on a rotatably mounted shaft passing through said partition,
   a pinion mounted on the shaft to the rear of the partition,
   a sector gear engaged by the pinion,
   a drum carrying said sector gear and rotatably mounted adjacent the rear face of the partition on an axis parallel to the axis of the pinion,
   a flexible band passing around the drum for rotating the drum and having a pair of free ends,
   a first extension coil spring having one end secured to the housing and the other end secured to one of the free ends of the band,
   a second extension coil spring having an end connected to the other of said free ends of the band,
   a slide connected to the other end of the second spring and adjustably secured to the partition for preloading said springs and zero adjusting the pointer, and
   a force transmitting beam secured to the drum and extending through an opening in the peripheral wall and beyond the housing, the peripheral wall limiting the movemend of the beam.

2. A gram beam force gauge comprising:
   a housing having a peripheral wall and a partition with a front face and a rear face substantially perpendicular to the peripheral wall,
   a dial mounted on the front face of said partition,
   a pointer overlying said dial and mounted on a rotatably mounted shaft passing through said partition,
   a pinion mounted on the shaft to the rear of the partition,
   a sector gear engaged by the pinion,
   a drum carrying said sector gear and rotatably mounted adjacent the rear face of the partition on an axis parallel to the axis of the pinion,
   a flexible band passing around the drum for rotating the drum and having a pair of free ends,
   a first extension coil spring having one end secured to the housing and the other end secured to one of the free ends of the band,
   a second extension coil spring having an end connected to the other of said free ends of the band,
   a block having a slot,
   means for connecting the other end of the second spring to the block,
   a headed screw having a shank passing through said slot and threaded to said partition to adjustably position said block for preloading both extension springs and zero adjusting the pointer, and
   a force transmitting beam secured to the drum and extending through an opening in the peripheral wall and beyond the housing, the peripheral wall limiting the movement of the beam.

3. a gram beam force gauge comprising:
   a housing having a peripheral wall and a partition with a front face and a rear face substantially perpendicular to the peripheral wall,
   a dial mounted on the front face of said partition,
   a pointer overlying said dial and mounted on a rotatably mounted shaft passing through said partition,
   a pinion mounted on the shaft to the rear of the partition,
   a sector gear engaged by the pinion,
   a drum carrying said sector gear and rotatably mounted adjacent the rear face of the partition on an axis partition to the axis of the pinion,
   a flexible band passing around the drum for rotating the drum and having a pair of free ends,
   a first extension coil spring having one end secured to the housing and the other end secured to one of the free ends of the band,
   a second extension coil spring having an end connected to the other of said free ends of the band,
   said band and spring straddling the sector gear and pinion,
   a block having a slot,
   means for connecting the other end of the second spring to the block,
   a headed screw having a shank passing through said slot and threaded to said partition to adjustably position said block for preloading both extension springs and zero adjusting the pointer, and
   a force transmitting beam secured to the drum and extending through an opening in the peripheral wall and beyond the housing, the peripheral wall limiting the movement of the beam and said beam extending in a direction away from said springs.

4. A gram beam force gauge comprising:
   a housing having a peripheral wall and a partition with a front face and a rear face substantially perpendicular to the peripheral wall,
   a dial mounted on the front face of said partition,
   a pointer overlying said dial and mounted on a rotatably mounted shaft passing through said partition,
   a pinion mounted on the shaft to the rear of the partition,
   a sector gear engaged by the pinion,
   a drum carrying said sector gear and rotatably mounted adjacent the rear face of the partition on an axis parallel to the axis of the pinion,
   a flexible band passing around the drum for rotating the drum and having a pair of free ends, a first extension coil spring having one end secured to the housing and the other end secured to one of the free ends of the band, a second extension coil spring having an end connected to the other of said free ends of the band and offset upwardly with respect to the first spring, said band and spring straddling the sector gear and pinion, a block having a slot, means for connecting the other end of the second spring to the block, a headed screw having a shank passing through said slot and threaded to said partition to adjustably position said block for preloading both extension springs and zero adjusting the pointer, and a force transmitting beam secured to the drum and extending through an opening in the peripheral wall and beyond the housing, the peripheral wall limiting the movement of the beam and said beam extending in a direction away from said springs.

* * * * *